(12) United States Patent
Gordon et al.

(10) Patent No.: US 9,418,086 B2
(45) Date of Patent: Aug. 16, 2016

(54) DATABASE ACCESS

(71) Applicant: Microsoft Corporation, Redmond, WA (US)

(72) Inventors: Andrew Donald Gordon, Cambridge (GB); Thore Kurt Hartwig Graepel, Cambridge (GB); Nicolas Philippe Marie Rolland, Cambridge (GB); Eric Johannes Borgstrom, Stockholm (SE); Claudio Vittorio Russo, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 13/971,206

(22) Filed: Aug. 20, 2013

(65) Prior Publication Data

US 2015/0058337 A1 Feb. 26, 2015

(51) Int. Cl.
*G06F 17/30* (2006.01)
*G06N 7/00* (2006.01)

(52) U.S. Cl.
CPC .... *G06F 17/30292* (2013.01); *G06F 17/30303* (2013.01); *G06N 7/005* (2013.01)

(58) Field of Classification Search
CPC combination set(s) only.
See application file for complete search history.

(56) References Cited

U.S. PATENT DOCUMENTS

| | | | |
|---|---|---|---|
| 2002/0103793 A1 | 8/2002 | Koller et al. | |
| 2006/0063503 A1* | 3/2006 | Brekelmans | H03J 1/0008 455/290 |
| 2009/0024652 A1* | 1/2009 | Thompson et al. | 707/102 |
| 2009/0216777 A1* | 8/2009 | Wang et al. | 707/100 |
| 2010/0145902 A1 | 6/2010 | Boyan et al. | |
| 2011/0066577 A1* | 3/2011 | Van Gael et al. | 706/12 |
| 2011/0314039 A1 | 12/2011 | Zheleva et al. | |
| 2013/0144812 A1 | 6/2013 | Chaganty et al. | |
| 2014/0188928 A1* | 7/2014 | Singh | G06F 17/30289 707/769 |

OTHER PUBLICATIONS

"International Search Report & Written Opinion for PCT Application No. PCT/US2014/051399", Mailed Date: Nov. 10, 2014, 9 pages.
Singh, et al., "Compiling Relational Database Schemata into Probabilistic Graphical Models", Published on: Dec. 5, 2012, Available at: http://research.microsoft.com/pubs/184297/InfernoDB-NIPS-WS-2012%20paper.pdf.
Taskar, et al., "Discriminative Probabilistic Models for Relational Data", In Proceedings of the Eighteenth Conference on Uncertainty in Artificial Intelligence, Aug. 1, 2002, 8 pages.

(Continued)

*Primary Examiner* — Etienne Leroux
(74) *Attorney, Agent, or Firm* — Tom Wong; Micky Minhas; Zete Law, P.L.L.C.

(57) ABSTRACT

Database access is described, for example, where data in a database is accessed by an inference engine. In various examples, the inference engine executes inference algorithms to access data from the database and carry out inference using the data. In examples the inference algorithms are compiled from a schema of the database which is annotated with expressions of probability distributions over data in the database. In various examples the schema of the database is modified by adding one or more latent columns or latent tables to the schema for storing data to be inferred by the inference engine. In examples the expressions are compositional so, for example, an expression annotating a column of a database table may be used as part of an expression annotating another column of the database.

20 Claims, 10 Drawing Sheets

(56) References Cited

OTHER PUBLICATIONS

Getoor, et al., "Learning Probabilistic Models of Relational Structure", In Proceedings of the 18th International Conference on Machine Learning, Jun. 28, 2001, 8 pages.

McCallum, et al., "FACTORIE: Efficient Probabilistic Programming for Relational Factor Graphs via Imperative Declarations of Structure, Inference and Learning", In Proceedings of the Neural Information Processing Systems Workshop on Probabilistic Programming, Dec. 13, 2008, 3 pages.

Gordon, Andrew D., "An Agenda for Probabilistic Programming: Usable, Portable, and Ubiquitous", Published on: Jan. 2013, Available at: http://research.microsoft.com/en-us/projects/fun/agendaforprobabilisticprogramming.pdf.

U.S. Appl. No. 13/646,739, Gordon, et al., "Modeling Data Generating Process", filed Oct. 8, 2012.

U.S. Appl. No. 13/731,800, Singh et al., "Relational Database Management", filed Dec. 31, 2012.

Gordon, et al., "A Model-Learner Pattern for Bayesian Reasoning", In Proceedings of the 40th Annual ACM SIGPLAN-SIGACT Symposium on Principles of Programming Languages, Jan. 23, 2013, 14 pages.

U.S. Appl. No. 13/530,121 Graepel, et al., "Checking and/or completion for data grids" filed Jun. 22, 2012.

Dalvi, et al., Probabilistic database: diamonds in the dirt Commun ACM, 52(7): 86-94, Jan. 2009.

Gordon, et al., A Model-Learner pattern for Bayesian Reasoning. In POPL, pp. 403-416, Jan. 2013.

Heckerman, et al., Probabilistic Entity-Relationship Models, PRMS and Plate Models. In L. Getoor and B. Taskar, editors Introductions to Statistical Relational Learning, Jan. 2007.

Shafto, et al., Learning cross-cutting systems of categories. In Proceedings of the 28th Annual Conference of the Cognitive Science Society, Jan. 2006.

Van Gael., PQL—Probabilistic query language. Blog post available at http://jvangael.github.oi/2011/05/12/pq1a-probabilistic-query-lanaguage/, May 2011.

"Second Written Opinion Received for PCT Patent Application No. PCT/US2014/051399", Mailed Date: Jul. 22, 2015, 5 pages.

"International Preliminary Report on Patentability Received for PCT Application No. PCT/US2014/051399", Mailed Date: Nov. 12, 2015, 6 pages.

\* cited by examiner

400 Players

| ID | Name |
|----|------|
| 0 | Alice |
| 1 | Bob |
| 2 | Cynthia |

402 Matches

| ID | Player 1 | Player 2 | Win 1 |
|----|----------|----------|-------|
| 0 | 0 | 1 | false |
| 1 | 1 | 2 | false |

404 Players Latent

| ID | Skill |
|----|-------|
| 0 | Gaussian (22.51, 0.69) |
| 1 | Gaussian (25.22, 0.6552) |
| 2 | Gaussian (27.93, 0.6896) |

406 Matches Latent

| ID | Performance 1 | Performance 2 |
|----|---------------|---------------|
| 0 | Gaussian (22.49, 0.9026) | Gaussian (25.25, 0.8782) |
| 1 | Gaussian (25.2, 0.8771) | Gaussian (27.96, 0.9022) |

408 Matches

| ID | Player 1 | Player 2 | Win 1 |
|----|----------|----------|-------|
| 3 | 2 | 0 | ? |

410 Matches Query Latent

| ID | Win 1 |
|----|-------|
| 3 | Bernoulli (0.85) |

FIG. 4

DATABASE ACCESS

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Databases are widely used for data storage in many application domains. Data may be accessed efficiently from databases by sending queries to the database using a suitable query language. The query results are then used by downstream processes for the particular task involved. However, typically the downstream processes expect query results from the database in a particular form. This means that intermediate, or linking software typically needs to be written to export data from existing databases and manipulate that data before input to the downstream process. As a result data access from the database by the downstream process may be inefficient. Also, the intermediate or linking software typically needs to be specially written for the particular downstream process and this is time consuming and error prone. These problems are particularly acute in application domains in which large amounts of data are used and where missing values, outliers, erroneous values and other problems with the data occur.

These types of application domain include machine learning applications in which it is often beneficial to use huge amounts of data as this enables better learning outcomes to be achieved. However, any inefficiencies in database access by intermediate or linking software are exacerbated where huge amounts of data are to be accessed.

The embodiments described below are not limited to implementations which solve any or all of the disadvantages of known database access systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Database access is described, for example, where data in a database is accessed by an inference engine. In various examples, the inference engine executes inference algorithms to access data from the database and carry out inference using the data. In examples the inference algorithms are compiled from a schema of the database which is annotated with expressions of probability distributions over data in the database. In various examples the schema of the database is modified by adding one or more latent columns or latent tables to the schema for storing data to be inferred by the inference engine. In examples the expressions are compositional so, for example, an expression annotating a column of a database table may be used as part of an expression annotating another column of the database.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 is an example of a relational database;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of computing device including but not limited to smart phones, table computers, game consoles, interactive entertainment systems, cloud computing environments, and others.

Figure 1:
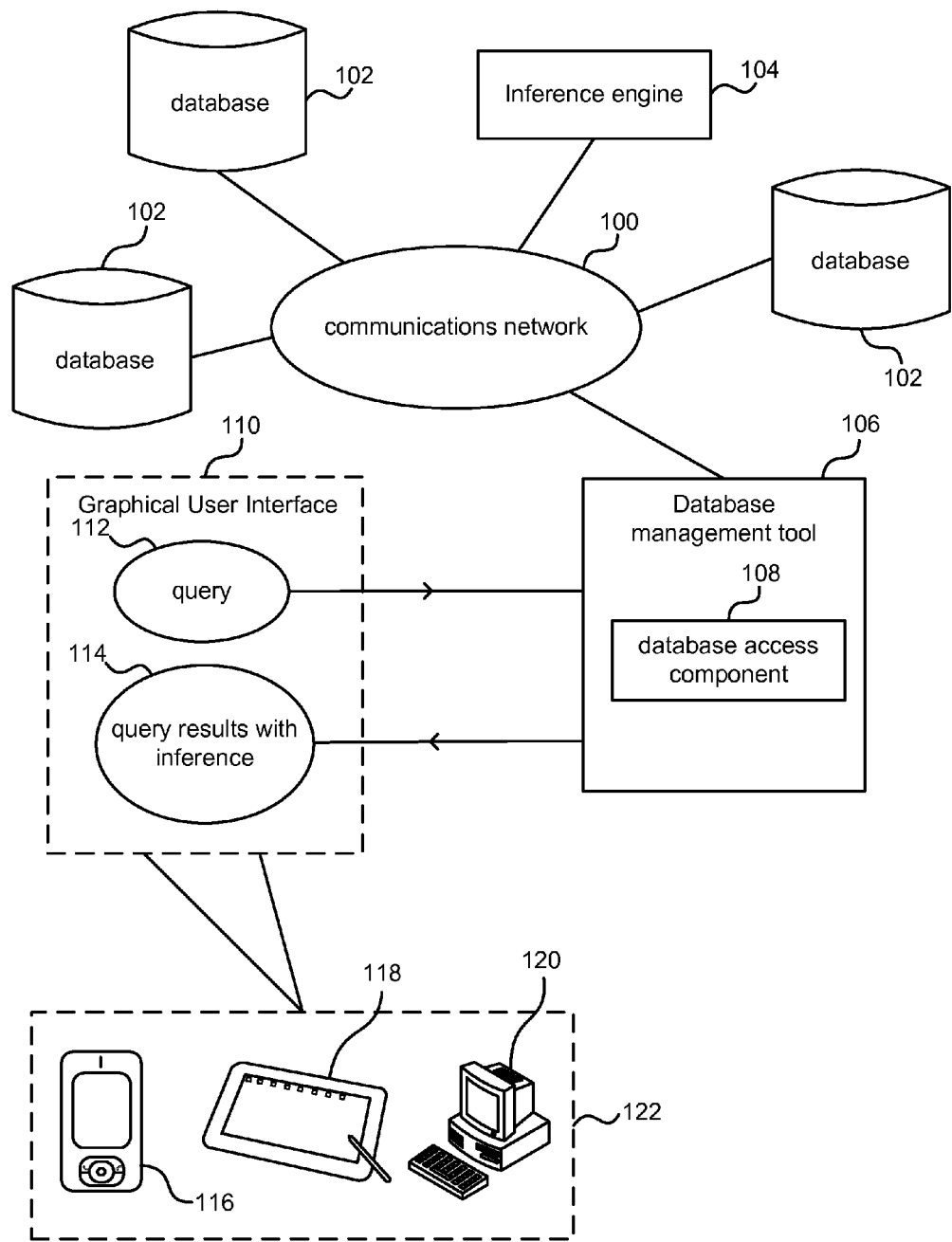
FIG. 1 is a schematic diagram of a database management tool having a database access component for accessing one or more databases.

FIG. 1 is a schematic diagram of a database management tool 106 which has an integral database access component 108. The database management tool 106 is computer implemented, for example, it may be a software application for querying one or more databases 102 that are in communication with it over a communications network 100 such as the internet, an intranet or other communications network. The databases 102 may or may not be relational databases. A combination of one or more relational databases 102 and one or more non-relational databases may be used. A non-exhaustive list of examples of non-relational databases is: graph database, object database, XML database, JSON database.

An XML (extensible markup language) database or JSON (Java script object notation) database store semi-structured data. The database management tool 106 has access to a database schema for each of the databases 102 it is able to access. In the case of a relational database, examples of schemas are given later in this document. In the case of an object database the schema corresponds to class declarations. In the examples below, a relational database with tables having columns and rows and optionally foreign keys, correspond to classes, members, objects and references in object databases. In the case of XML or JSON databases, the terms "tags" or "collections", "properties", "elements" or "documents", and "names" are used to refer to "tables", "columns", "rows" and "foreign keys" respectively.

The database management tool 106 may also enable a database to be created, edited or deleted. The database management tool 106 may enable data to be stored in one or more databases which may or may not be relational databases. A relational database comprises a plurality of tables of data where the tables are linked to one another. The term "relational database" is explained in more detail with reference to FIG. 2 below.

The database access component 108 is also computer implemented, for example, as software and/or hardware logic. The database access component is arranged to work with inference engine 104 to access data from all or part of at least one database in an efficient manner so that the inference engine can carry out machine learning using the accessed data. The database access component annotates a schema of the database(s) with expressions described in more detail below. A schema of a database is a description of how data is organized in a database. The schema may describe how semi-structured data, such as XML or JSON, is stored.

The expressions describe probability distributions over data entries in the database. Each expression describes a process for generating entries of the associated column in terms of parameters or hyperparameters, where a hyperparameter describes knowledge about the parameters. The expressions may be compositional. For example, an expression may describe a process for generating entries of its associated column in terms of one or more other columns or tables of the schema. The database access component also adds one or more latent columns to the database schema and database and optionally adds one or more latent tables to the database schema and database. A latent column is a column of a table created to store data to be inferred by inference engine 104 and which is not observed data or input data. A latent table is a table of a database created to store data to be inferred by inference engine 104 and which is not observed data or input data. Input, observable and latent columns are explained in more detail with reference to FIG. 2.

The database access component also has a type for each column of the database schema, where a type can be any of: integer, Boolean, real, string, link (in the case of a relational database), date-time, percentage or others. The type "link" indicates a foreign key. The database access component may infer or interpret the types of the columns automatically as described in more detail below. The database access component also has a label for each column of the database indicating whether it is to be an input column, an output observable column or an output latent column. Latent columns are those added by the database access component and are output columns. The other columns may be identified as input or output observable according to user input and/or automated analysis.

The database access component and the inference engine operate to compile the annotated database schema with the added latent columns and/or tables to form inference algorithms. The annotated schema also has a label indicating, for each column, if it is an input, output latent, or output observable column. The annotated schema also has a type for each column (such as integer, real, float, double, Boolean, string, foreign key (referred to in this document as "link"). The compilation process may comprise more than one stage. For example, the annotations may be written in a high level programming language which is compiled to successively lower level programming languages in several stages. The inference engine is able to execute the inference algorithms to access data from the databases in a manner specified by the inference algorithms and to carry out inference using the accessed data. The inference results may be written to the latent tables and/or columns added to the database.

In some examples the database access component automatically adds the latent columns and/or tables and creates the annotations (expressions, input/latent/observable labels, and types) at the database management tool. In other examples, an end user adds the latent columns and/or tables and creates the annotations using a programming environment. The process of adding the latent columns and/or tables and annotations may be semi-automatic.

The database access component 108 shown in FIG. 1 is integral with the database management tool 106 although this is not essential. The database access component 108 may be located at any other entity which is in communication with the database management tool 106. The database access component 108 may cache inference results it receives from the inference engine 104.

An end user is able to use the database management tool 106 and database access component 108 using a graphical user interface 110 accessible from his or her computing device 122 such as a phone 116, tablet computer 118 or personal computer 120. The graphical user interface 110 may be web-based or may be of any other suitable type. Examples of graphical user interface displays which may be provided are discussed later with reference to FIGS. 7 to 9. The graphical user interface 110 may be provided by the database management tool 106, by the database access component 108, or by any other entity in communication with the database management tool 106 and database access component 108. By using the graphical user interface the end user is able to make use of the power of probabilistic inference even if he or she has little or no training in statistics or machine learning. Existing databases may be used without the need to export data from the existing databases and manipulate that data before carrying out machine learning and inference. Also, the end user does not need to pre-process data, for example, to transform variables of different types or remove examples with missing data. This simplifies operation for the end user. The end user may operate the database in a similar manner as previously done for databases as the inference happens in the background and the inference results may simply be incorporated with database query results.

The end user may input, using the graphical user interface 110, a query 112 to the database management tool 106 in order to send a query to one of the databases 102. The database management tool 106 returns a query result which is obtained from the database using known database processes. The database management tool 106 is also able to return a query result with inference 114. That is, where the results of the query comprise values and information which have been calculated by the database access component 108 working in conjunction with the inference engine 104.

For example, query results with inference may comprise data accessed from latent columns and/or latent tables which has been inferred by inference engine 104. In an example described below the skill of a player of a game is inferred by inference engine 104 and the skill is a latent variable stored in a latent column added to the database schema. The query may ask what the skill of a player is and the query results with inference comprise the skill value. In this way the end user receives inferred data about skills of players. This is one example only, many other latent columns and latent tables may be used depending on the application domain.

Query results with inference may comprise inferred data about non-latent columns of the database, in addition to or alternative to inferred data from latent columns of the database. A non-exhaustive list of examples of inferred data about non-latent columns of the database is: filled missing data, identified erroneous data, error correction suggestions, identified outlier data. For example, cells which have no data may be completed by the database access component 108 and the filled data may be returned as part of a query result with inference 114. This is possible even where the completed cells are completed with foreign key values. A foreign key is an entry in a table cell which refers to a row, tuple or record of another table. For example, cells which have erroneous data may be identified by the database access component 108 and the errors and suggested corrections may be returned as part of a query result with inference 114. Many other examples of query results with inference 114 are possible as discussed in more detail below.

In examples where the process of adding the latent columns and/or tables and annotations is semi-automatic or manual, an end user may access a programming environment at the database management tool either via graphical user interface 110 or by any other communication between computing device 122 and database management tool 106. In some examples the database management tool 106 may be integral with computing device 122. The end user may add latent columns and/or tables to the database schema and create the annotations by writing instructions in a suitable probabilistic programming language at the programming environment. A probabilistic programming language is a programming language in which belief about the value of a variable is represented using a probability distribution. The annotations which are expressions in the probabilistic programming language may be compiled, by the database management tool and/or the inference engine 104, into inference algorithms.

By using the annotations the database access component and the inference engine do not need to use a factor graph structure explicitly. This is beneficial, especially for complex tasks where factor graphs become awkward to write by hand. The annotations may be compiled to probabilistic programming language code where random variables are program variables, factors are primitive operations, plates are loops and gates are conditionals or switches.

By using the modeling of the data encoded in the concrete schema it is possible to use succinct annotations. Each table description implicitly defines a loop over its rows. The user is saved the trouble of writing code to transfer data and results between language and database. Also, annotations of individual columns may be assembled compositionally which enables the database access component to build up complex models in a simple and effective manner.

Because the databases and the inference engine may be located in the cloud large amounts of data may be available to the inference engine where those amounts may be larger than an amount of data which may practically and/or usefully be displayed at an end user device in a graphical user interface. By using large amounts of data at the inference engine the accuracy and certainty of predictions made by the inference engine may be increased.

Alternatively, or in addition, the functionality of any of the entities of FIG. 1, or any parts of those entities, can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

In the examples of FIGS. 2, 4, 6, 7, 8 and 9 relational databases are used. However, non-relational databases may also be used.

Figure 2:
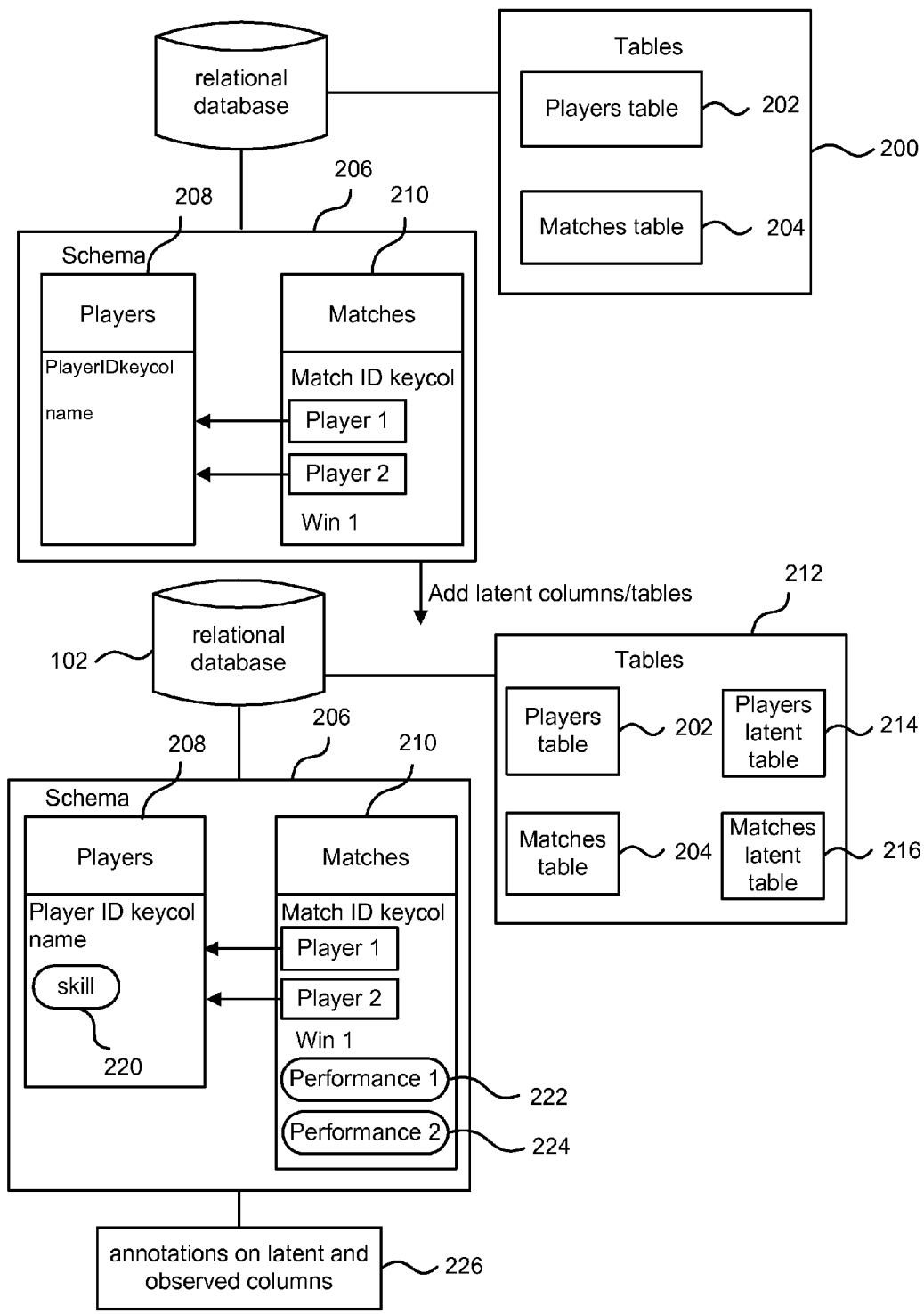
FIG. 2 is a schematic diagram of a relational database schema and latent tables and annotations added to the relational database schema.

FIG. 2 is a schematic diagram of a relational database which may be one of the databases 102 of FIG. 1. As mentioned above a relational database comprises a plurality of tables 200 of data where the tables are linked to one another. Each table has cells of data arranged in columns and rows. In this example only two tables are shown for clarity although in practice many more tables may be present. The two tables in this example comprise a players table 202 and a matches table 204. For example, the players table 202 comprises two columns (player key, name) and one row for each user. For example, the matches table 204 comprises four columns (match key, player 1 foreign key which links to the appropriate row of the players table, player 2 foreign key which links to the appropriate row of the players table, and win 1 which stores a Boolean value representing true if player 1 wins the match and false if player 1 loses the match) and one row for each match. In this example the matches are two player matches; for matches with other numbers of players and/or teams of players the schema is extended as appropriate. The raw tables of the database 102 may be referred to as concrete tables as these comprise already available data which may be empirical data. However, in some examples, where the inference results are used to clean up the empirical data, the empirical data may comprise inference results. For example, filled in missing data, error corrections and similar.

A relational database has a schema which defines the tables it stores and links between those tables (also referred to as foreign keys). In the example of FIG. 2 a schema 206 of a relational database is illustrated. The schema comprises, for each table, a description of the columns and, for each foreign key, knowledge of how that foreign key links two or more tables. In the example of FIG. 2 the schema 206 comprises a description of the columns of the players table 208 and a description of the columns of the matches table 210 as well as information about how the foreign keys in the matches table connect to the players table.

As mentioned above, each table has cells of data arranged in columns and rows. The data values in the cells may be numerical or categorical or free text (strings) and some of the cells may be empty. An empty cell may be referred to as a cell having an unobserved data value or having a null data value. In the examples described herein the data in the one or more rows represent independent events, objects or entities. The data in the columns represent attributes and have a uniform type across rows; that is, data values within a column have the same type with the exception of missing values which may be marked empty, null or by some string such as "???". A non-exhaustive list of examples of types of data value is: real, float, Boolean, link (which specifies a foreign key to a specified table), categorical, integer, percentage, string, date, time. The database access component 108 labels each column with a type, either according to user input, or according to the results of a type inference process, or using a combination of these approaches. For example, to determine data value types for the columns, the database access component 108 may inspect the database. For example, a column may contain the symbols "0", "1", "2", "3", which may be interpreted as categories represented by numerals or which may be interpreted as numbers. The inference engine may infer the true underlying type by applying machine learning/statistical modeling.

As mentioned above, the database access component 108 adds latent columns and/or latent tables to a schema of a database. The database access component 108 may add the latent columns and/or latent tables automatically using rules and/or criteria stored at database management tool 106. For example, latent columns may be added in a trial and error manner as described in more detail below with reference to FIG. 3. In some examples the latent columns and/or tables are added by a user operating a programming environment as mentioned above. Combinations of these two approaches are possible.

In the example of FIG. 2 one latent column is added to the players table and two latent columns are added to the matches table as now described.

A latent column representing player skill is added to the players table so that description 208 comprises another column 220 which is circled in FIG. 2 to indicate that it is a latent column. The other column, holding the player's name, is of type "string" and is an input column. A latent column representing performance of player 1 in a given match against player 2 is added to description 210 of the matches table in the schema 206. This is shown as performance 1 222 in FIG. 2 and is circled to indicate that it is a latent column. In the same way a latent column 224 representing performance of player 2 in a given match against player 1 is added to description 210 of the matches table in the schema 206. The other columns of the matches table are the foreign key columns for player 1 and player 2 which are both input columns of type "link" and the win1 column which is an observable column of type Boolean.

The latent columns may be stored in the same store(s) as the concrete tables 202, 204, as a players latent table 214 and a matches latent table 216 which may be joined with the concrete tables 202, 204. The players latent table 214 and the matches latent table 216 are described in more detail below with reference to FIG. 4.

With respect to the schema 206, in its form modified by adding the latent columns, the columns of a given table may be any of: input, latent, and observable. An input column comprises data which is from the raw database 102 and which is given or available in advance of the database access component operation. For example, the name of a player, and a player key. An input column comprises data which is not to be inferred. A latent column is one added by the database access component. A latent column comprises data which is inferred by the database access component in conjunction with inference engine 104. An observable column comprises data which is from the raw database 102. For example, it is empirical or observed data which may or may not be cleaned up by filling missing values and error correction using inference results. An observable column may be a latent column in some examples, for example, where predictions of events are to be made. In this case, another table (referred to in this document as a query table) may be added to the tables 212 and schema 206 where the observable column is expressed as a latent column. This is described in more detail with reference to FIGS. 6 and 7.

As indicated in FIG. 2 annotations 226 are added to latent and observable columns. The database access component 108 may add the annotations automatically using template annotations stored at database management tool 106. For example, annotations may be added in a trial and error manner as described in more detail below with reference to FIG. 3. In some examples the annotations are added by a user operating a programming environment as mentioned above. Combinations of these two approaches are possible. Each annotation is an expression in a probabilistic programming language. Each annotation expresses a probability distribution over data of one or more columns of the database. More detail about the annotations is given later in this document.

Figure 3:
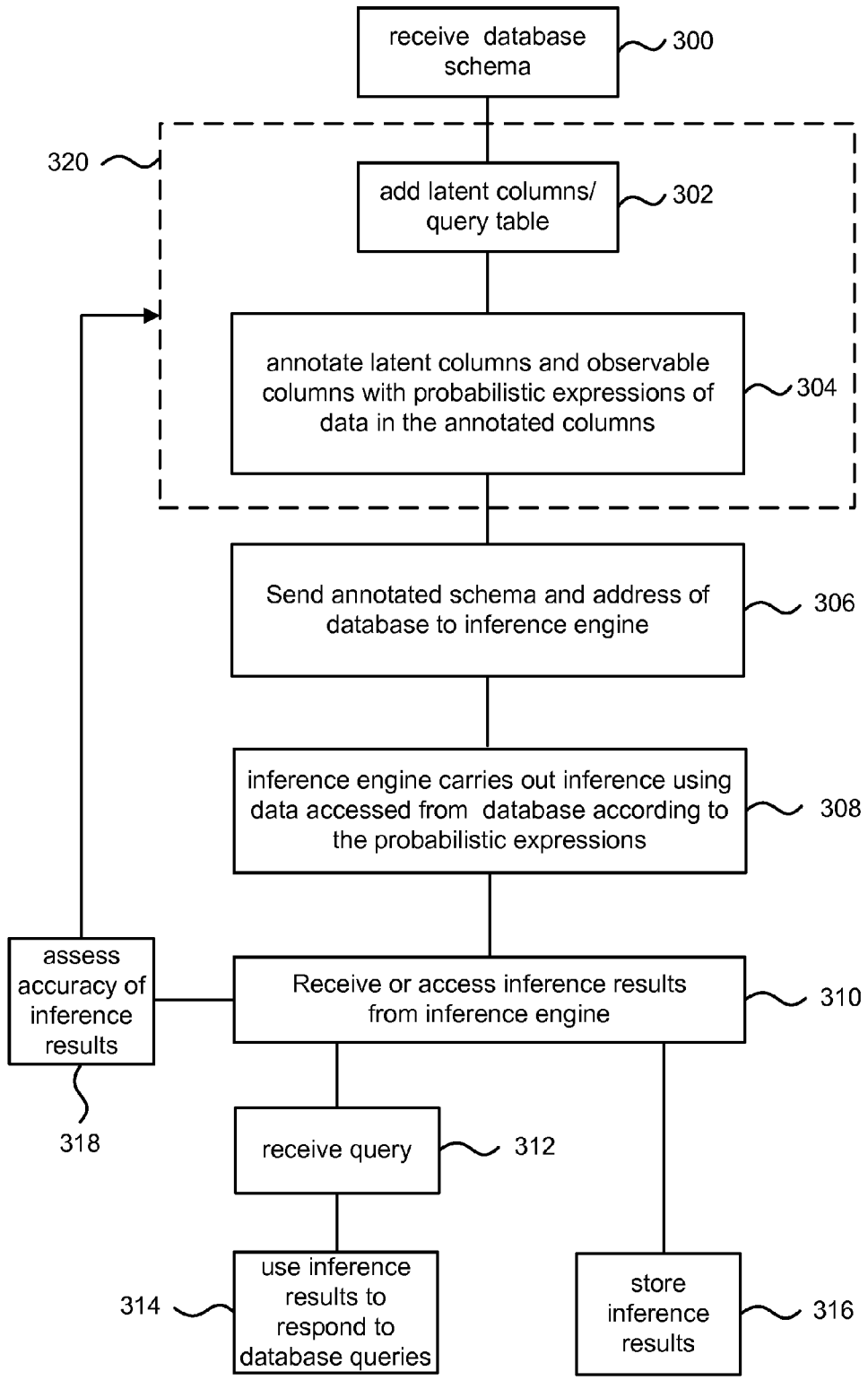
FIG. 3 is a flow diagram of a method at the database access component of FIG. 1.

FIG. 3 is a flow diagram of an example method at the database access component 108 of FIG. 1. The database access component 108 receives 300 a database schema and an address (or identifier) of all or part of a database which uses that schema and which is to be accessed. For example, the database management tool 106 knows the database schema of each of the databases 102 that it manages.

The database access component 108 adds 302 one or more latent columns to the database schema it received. For example, these are added automatically by the database access component 108 according to rules and/or criteria stored at (or accessed by) the database management tool 106. The latent columns may be added according to user input specifying which latent columns to add. Combinations of user input and automatic generation of latent columns may be used. In the examples described in this document at least one latent column is added to each table of the database. However, this is not essential. Some of the tables may remain concrete with no added latent columns.

The database access component 108 establishes a store for the latent columns (together referred to as the latent database). Where the latent database is to be stored in the same database as the original concrete database, the database access component 108 creates the appropriate latent tables joined with the concrete tables at the database. Where the latent database, in whole or in part, is stored at another store, the database access component 108 creates the appropriate latent tables and keeps their addresses.

The database access component 108 annotates 304 the latent columns and the observable columns of the schema by creating instructions in a probabilistic programming language. Each annotation is an expression of a probability distribution describing belief about data of the column being annotated. The annotations may be made by the database access component 108 automatically using stored templates. The annotations may be input by a user of a programming environment accessible to the database access component 108. Together the annotations define a probabilistic model to generate the database (with the added latent columns).

The database access component 108 sends 306 the annotations, the types of the columns, the indications whether the columns are input, latent or observable, and the address of the database to an inference engine. In some examples, the database access component 108 carries out a first stage compilation of the annotations and sends the compilation results to the inference engine rather than the annotations themselves. The inference engine then carries out a second stage compilation to produce inference algorithms it may execute. The compilation stages and process may be shared between the database access component, inference engine, and any other entity.

The inference engine 104 carries out inference 308 using data accessed from the database according to the probabilistic expressions. In this way data is accessed from the database in an efficient manner without the need to export the data from the database and pre-process or manipulate that data in advance.

The database access component 108 may receive 310 the inference results from the inference engine in some examples. It is also possible for the inference engine and/or the database access component to store 316 the inference results in the latent database wherever that is located (such as at the same database as the original concrete database, or elsewhere). The database access component 108 is able to access the stored inference results.

The inference results comprise a plurality of posterior probability distributions which comprise: posterior predictive probability distributions of a value associated with a cell, predictive probability distributions of latent variables which are unobserved variables associated with latent columns, and posterior distributions on parameters associated with latent and observable columns. There may be a predictive probability distribution for each database table cell of a latent or observable column, where the probability distribution represents belief about the value of a data item in that cell. (The data in input columns is supplied as input to the inference process, and no probability distributions for cells in input columns are available.) The probability distributions may be provided in any suitable form, for example, as samples taken from the probability distribution, as a mean and variance describing the probability distribution, as a histogram, or in other ways.

The inference results may be obtained from two different forms of inference. A first form of inference infers latent columns and parameters from observed data which is complete for each row. A second form of inference predicts missing values from partially-observed data; for example, by inferring a posterior probability distribution of missing values in observable columns conditioned on observed values actually present in the database.

The database access component 108 may receive 312 a database query from a user via the graphical user interface of FIG. 1 or in any other way. The database access component 108 is able to use 314 the inference results to respond to the database query. For example, the query is forwarded to the database in the case where that database also holds the inference results. The answer to the query may comprise data from latent columns which has been inferred by inference engine 104.

The database access component may also use the predictive probability distributions to do one or more of: identify outlying values in the database, identify erroneous values in the database, suggest corrections to erroneous values in the database, cluster cells in the database, identify cells or tables which influence the predictive probability distribution of a specified cell, identify cells for active learning. The database access component may also export the annotations and added latent columns as a file. For example, to make predictions in another database of the same schema.

The database access component 108 is able to assess 318 the accuracy of the inference results in some examples. For example, the inference results comprise probability distributions and variances or related statistics of those probability distributions may indicate levels of certainty of the inference results. The variances or related statistics may be compared with threshold values or against previous values and used as a form of feedback to steps 320 of FIG. 3. This produces a trial and error process for annotating the latent and observable columns and/or for deciding on latent column additions.

FIG. 4 is an example of a relational database for the scenario of FIG. 2. In this example, the players table 400 comprises data for three players, Alice, Bob and Cynthia. The matches table 402 comprises data for two matches: match zero in which Alice played against Bob and Bob won; and match 1 in which Bob played against Cynthia and Cynthia won.

The annotation for the latent skill column of the players table may be for example: gen(Gaussian(25.0,0.01)) which means that belief about the skill of a player is initially (before learning takes place) described by a Gaussian probability distribution with a mean of 25.0 and a precision of 0.01. For example, each entry of the skill column is drawn from a Gaussian distribution with mean 25.0 and precision 0.01. The mean of 25.0 relates to the belief of the skill of the player expressed as a numerical rating and the precision indicates how certain the model is that the skill rating is correct.

The annotation for the latent performance 1 column of the matches table may be for example: gen(Gaussian(Player1.s, 1.0)) which means that belief about the performance of player 1, in a particular match is modeled as a Gaussian distribution with mean equal to the current skill of the player (from the players table) and precision 1.0. This is equivalent to adding noise to the current skill of the player to model the performance of the player in a particular match.

The annotation for the latent performance 2 column of the matches table may be for example: gen(Gaussian(Player2.s, 1.0)) which means that belief about the performance of player 2, in a particular match is modeled as a Gaussian distribution with mean equal to the current skill of the player (from the players table) and precision 1.0.

The annotation for the Win1 observable column of the matches table may be for example: gen(Performance1>Performance2) which means that belief that player 1 will win in a match with player 2 is modeled as the performance of player 1 being greater than the performance of player 2, where those performances are taken from the latent columns of the matches table.

In the particular example of FIG. 4 these annotations are compiled into inference algorithms and executed using data in the players and matches tables 400, 402. The inference results fill players latent table 404 and matches latent table 406 as shown with marginal representations of the distributions over the latent databases. In each of those tables, an entry Gaussian(x, y) indicates a Gaussian probability distribution with a mean x and a precision y.

Once the skill latent column and the player performance latent columns are filled it is possible for the end user to submit queries to retrieve data from those latent columns, in the same manner as for concrete columns.

It is also possible for observable columns to be converted into latent columns. For example, the win1 column of the matches table is an observable column which may be converted to a latent column in situations where it is desired to predict the outcomes of matches. In this case a query may be a row of the matches table with a missing entry in the win1 column as indicated at 408 in FIG. 4. The annotation for the win1 column is changed to indicate it is latent rather than observable. The inference engine compiles the annotations and carries out inference using data in the relational database tables 400, 402 and produces inference result 410 of FIG. 4 indicating that the belief that match 3 will be a win for player 1 85% of the time is represented by a Bernoulli distribution. Inference result 410 is stored in a matches query latent table as indicated in FIG. 4 and this is described in more detail with reference to FIG. 6.

Figure 5:
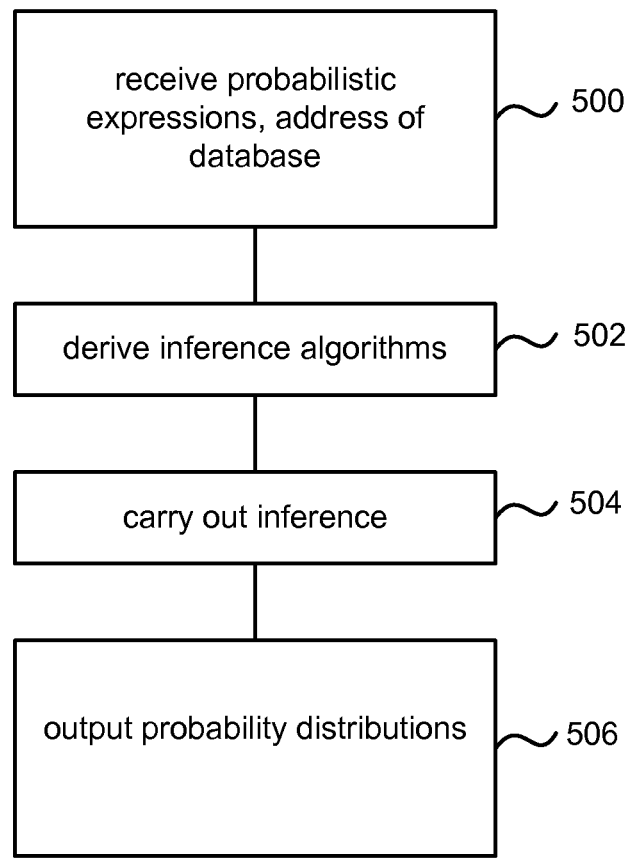
FIG. 5 is a flow diagram of a method at an inference engine.

FIG. 5 is a flow diagram of an example method at the inference engine 104 of FIG. 1. The inference engine receives 500 the annotations which together form a probabilistic model of the database (in whole or in part). It also receives an address of the database (or part of a database) which is to provide the data for inference.

The inference engine may be any software framework which is able to receive a probabilistic model in the form of annotations as described herein (or first stage compiled versions of the annotations) and compile that to produce inference algorithms that may be applied to the data in the database. For example, a software framework which implements exact inference, a software framework which implements sampling, the Infer.NET™ software framework or others. The software framework comprises functionality to enable parts of a probabilistic model to be switched on or off based on selector variables. For example, the Infer.NET™ software framework comprises gates functionality which provides this type of switching ability. The inference engine also comprises functionality to group elements of a probabilistic graphical model together into plates.

The inference engine compiles the annotations (or first stage compiled annotations) and so derives 502 inference algorithms. The inference algorithms are executed in order that inference is carried out 504 on the database or part of the database. The inference process may comprise a training phase where a first set of rows of the database tables are used as training data. A second set of rows of the database tables may then be used in a test phase to infer values. The inference engine outputs 506 probability distributions associated with the columns and/or cells of the database. This enables a probability distribution to be obtained for each cell of the relational database (except any cells omitted from inference) which expresses belief about the value of the cell's data.

Figure 6:
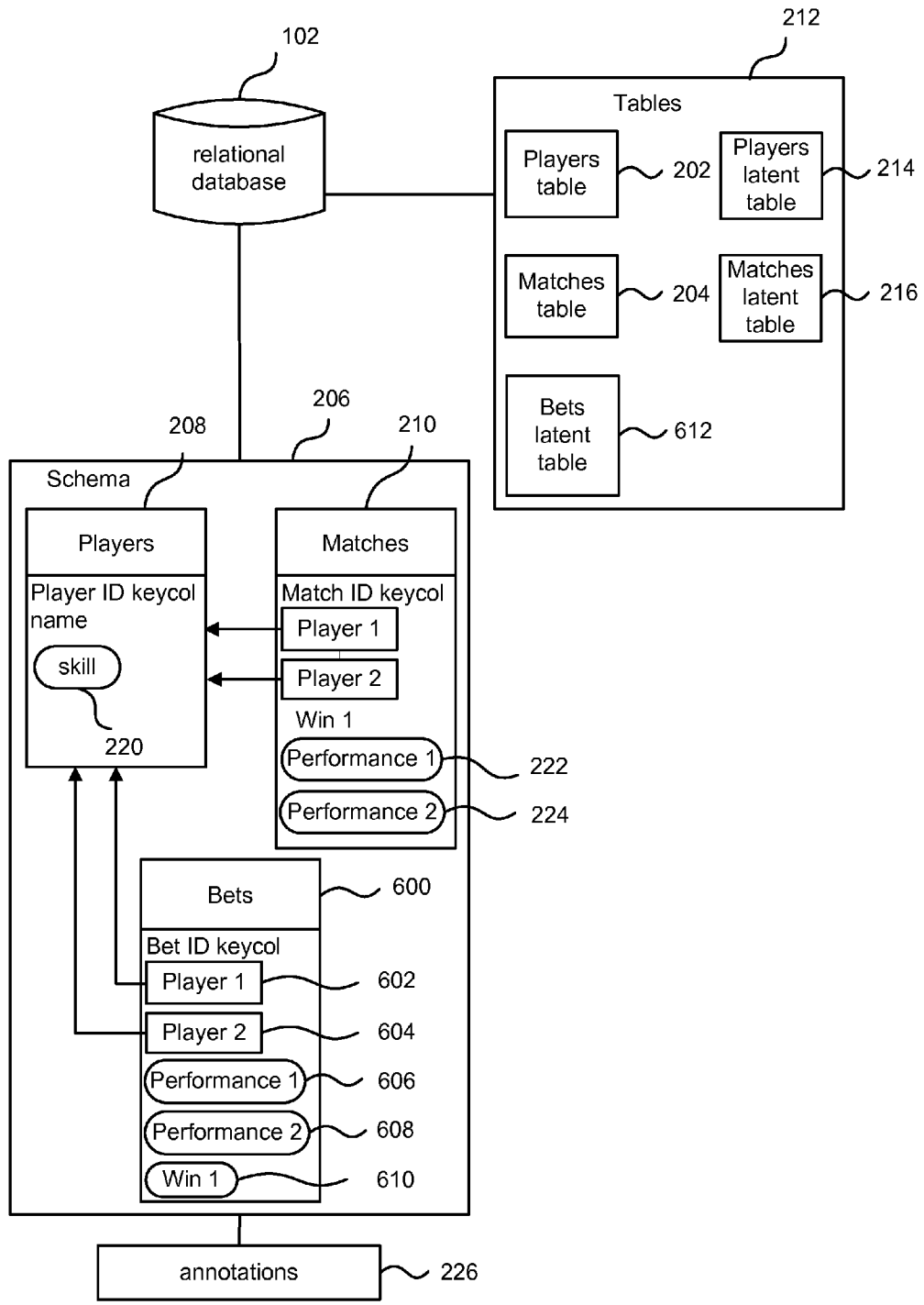
FIG. 6 is a schematic diagram of a relational database with a schema having added latent columns and an added latent table.

FIG. 6 is a schematic diagram of a relational database 102 with a schema 206 having added latent columns 220, 222, 224, 606, 608, 610 and an added latent table 600, 612. This example corresponds to the example of FIG. 2 and FIG. 4. In FIG. 4 the matches query latent table is equivalent to the bets latent table 612, 600 of FIG. 6. The schema of the relational database is annotated as described above with reference to FIG. 4 and bets latent table 612 is used to hold the inference results. For example, inference engine 104 or database access component 108 write the inference results into bets latent table 612. The schema for the relational database comprises a description 600 of the bets latent table 612 comprising a foreign key for player 1 602, a foreign key for player 2 604, a latent column 606 for performance of player 1, a latent column 608 for performance of player 2 and a latent column for the outcome win1 610. By placing multiple rows in the Bets table it is possible to predict the outcomes of multiple upcoming matches.

Figure 7:
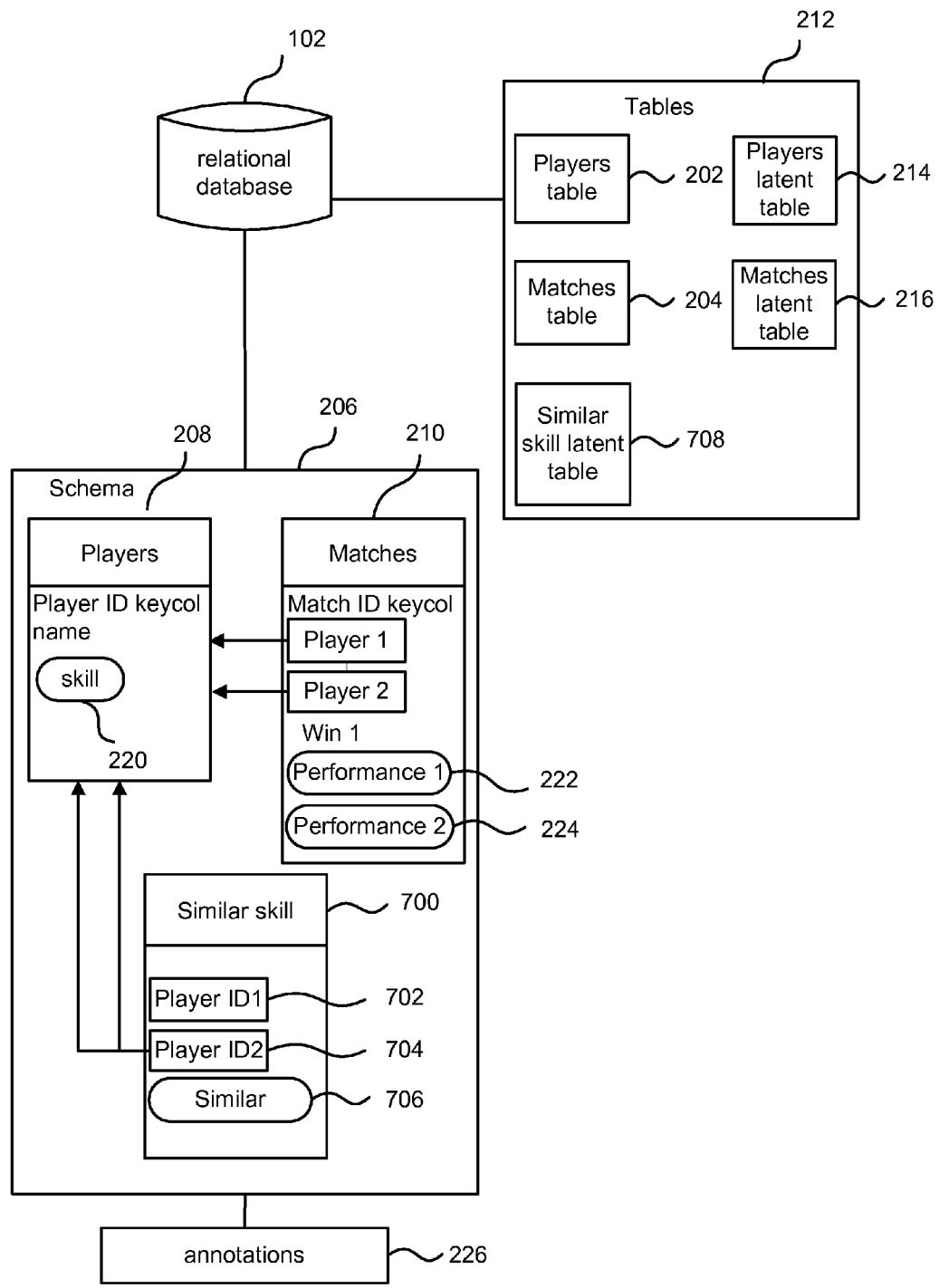
FIG. 7 is a schematic diagram of another relational database with a schema having added latent columns and an added latent table.

With reference to FIG. 7, consider an online situation where there is a large table of players, and a relatively small number of players queuing to begin online games. To select one of the queues to play against a new player a Similar skill query table 700 may be added to the schema as indicated in FIG. 7. The Similar query table 700 has foreign keys to the players table in the same way as the Bets table did. It is filled with rows for each combination of players (one from the queue and the new player). The latent column Similar 706 indicates whether two players are close in skill. Inference fills this column in the similar skill latent table 708 with Bernoulli distributions which can be used to select a partner close in skill to the new player.

Figure 8:
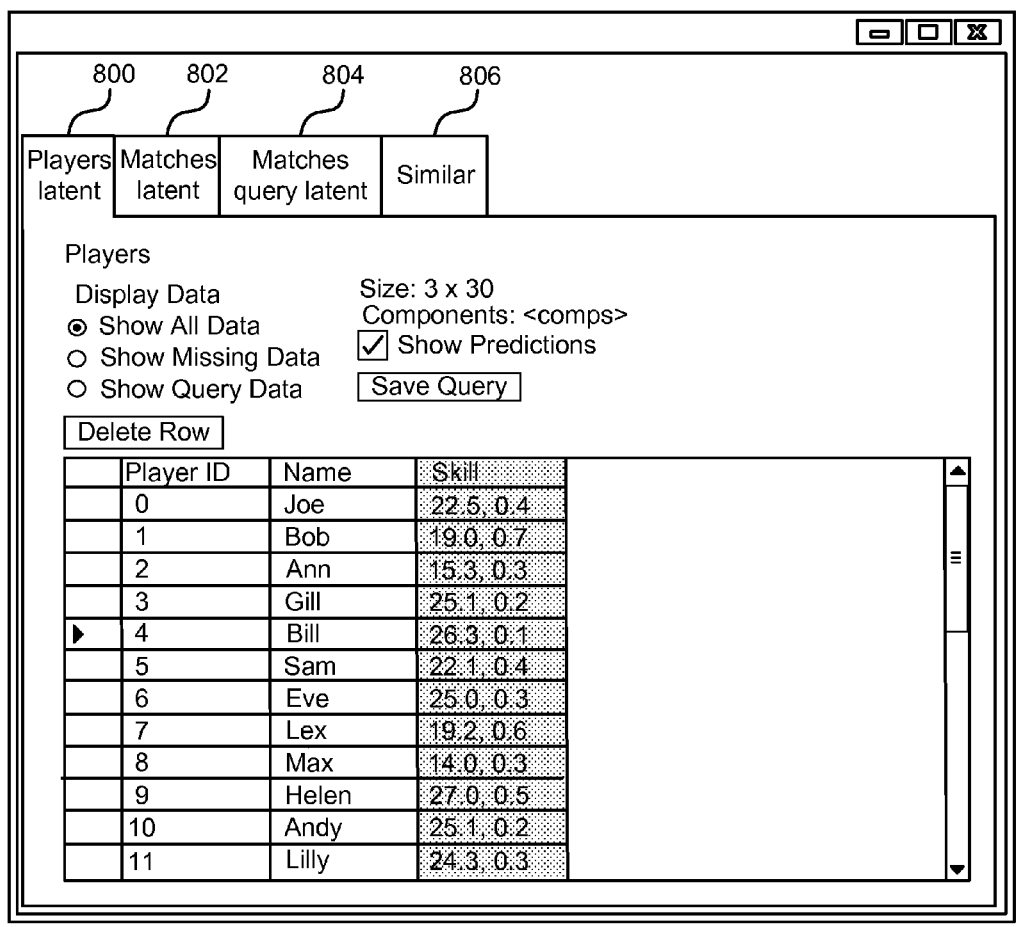
FIG. 8 is a schematic diagram of a graphical user interface display at end user equipment for accessing the database management tool of FIG. 1.

FIG. 8 is an example graphical user interface display which may be made at the graphical user interface 110 of FIG. 1. This example shows how the inference results may be used to fill in cells of a latent column. The graphical display has four tabs 800, 802, 804, 806 to enable a user to switch between displays of the players latent table, the matches latent table, the matches query latent table, and the similar table. In this example part of the players latent table is displayed. The user has selected a radio button to show all the data; that is the original data of the players concrete table with the latent data from inference (in this case the skills). The user also has the option to view only the missing data (i.e. empty cells) or to view query data (i.e. any rows and columns submitted to the database as part of a query). The size of the players latent table is shown in this example as 3 columns by 30 rows. The option to show predictions is selected and the buttons for saving a query and deleting a row are not currently available. The row of current interest to the user is indicated by the black arrow head at row 4 and optionally the shading of the cells in this row. The skill column is filled with mean and precision pairs of Gaussian distributions. This is one example of how the inference results may be displayed to a user. Other ways may be used. For example, a percentage may be displayed to indicate certainty of the predicted value. In other examples marginal statistics such as expectation or variance may be displayed, MAP values such as the top-k most probable configurations, error bars, error ranges, plot lines, histograms or other types of displays which convey information about the predictive probability distributions.

Figure 9:
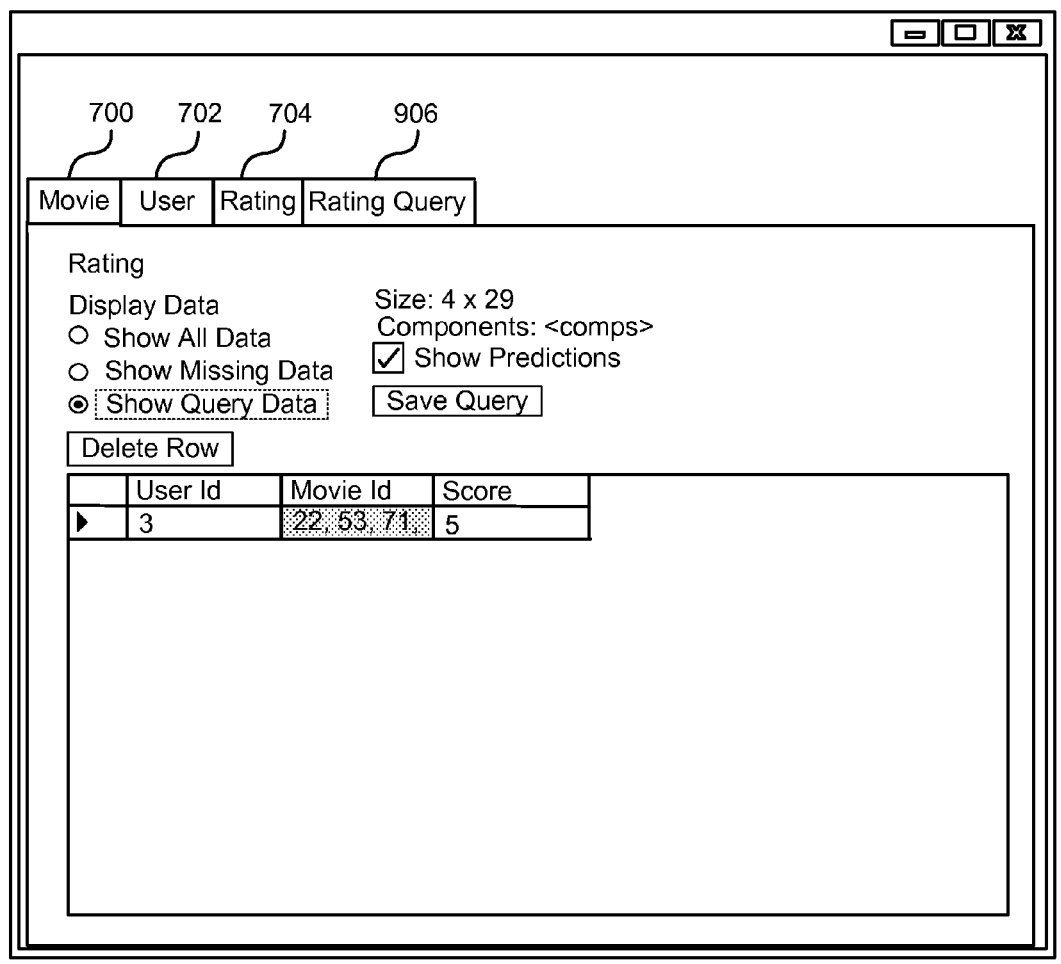
FIG. 9 is a schematic diagram of another graphical user interface display at end user equipment for accessing the database management tool of FIG. 1.

FIG. 9 is another example graphical user interface display which may be made at the graphical user interface 110 of FIG. 1. This example shows how the inference results may be used to predict probability distributions for queries on the database.

As for FIG. 8 the graphical display has four tabs 900, 902, 904, 906 to enable a user to switch between displays of a movie table, a user table a ratings table and a rating query table. In this example part of the rating table is displayed. The user has selected a radio button to show query data (i.e. any rows and columns submitted to the database as part of a query). In this example the query data comprises a single row of the rating table where the foreign key value to the user table is input by the user, as is the rating value (5 in this example) and the Movie ID is inferred as a list of Movie IDs.

This example shows how an end user may submit a query which is, "if the user is the user specified in row 3 of the user table, and rating is 5, then what will the movies be?". Other types of "what if" query may be made by changing the values submitted in the row. For example, an end user could ask what a foreign key value would be if the score and another foreign key value were known.

The graphical user interface may also comprise elements to enable a user to achieve any combination or one or more of: exclude at least one column or tables from inference, specify constraints between column values, specify potential dependencies between columns, re-run inference after accepting a change in the value of one or more cells of the database.

The predictive probability distributions provided by the inference engine may be used for other tasks as well as those described with reference to FIGS. 2, 4, 8 and 9. For example, to highlight cells having outlying values, identify potential errors, suggest corrections to potential errors, identify similarities between cells, identify differences between cells, cluster rows of the database, determine relations between columns of the table, identify existing cells or potential new rows and columns for which data would improve accuracy of predictions (active learning) and other tasks.

The predictive probability distributions from the inference engine may be used to highlight relationships and/or differences in a database. For example, between columns, or between rows of a table where similarities or differences in the predictive probability distributions are identified. Differences in the predictive probability distributions may be based on inferred model parameters such as association probabilities with mixture components or other latent variables. The similarities and/or differences may be displayed in the table at the graphical user interface using shading, colors or in any other way. In an example, a user may select a cell containing an inferred value (a value added to a cell by the database access component) and the database access component may highlight those cells that influence the inferred value the most. In another example, a user may select a cell containing an observed value and the database access component may highlight those cells containing inferred values which it influences the most.

In an example, the database access component may identify clusters of rows and create a new latent column of cluster labels. In some examples user guidance may be received such as where a user marks (in a new column) rows that he or she thinks are interesting and database access component then fills in the blank cells in that new column so as to label all the rows as interesting or not according to the same criteria as the human user.

As mentioned above the annotations to the schema of the database are written in a high level programming language referred to herein as TABULAR. For example, the programming language may be based on an F# probabilistic programming language referred to as FUN. FUN is described in detail in US patent application "Modeling data generating process" Ser. No. 13/646,739 filed on 8 Oct. 2012 and in Gordon et al. "A Model-Learner Pattern for Bayesian Reasoning" POPL January 2013.

TABULAR makes use of a version of FUN with arrays of deterministic size and without conditioning (observe) within expressions. Details of the syntax and semantics of TABULAR are now given.

TABULAR uses base types bool, int, and real, record types, and array types. Let string=int[ ] and vector=real[ ] and matrix=vector[ ]. (The type real is typically implemented using floating-point arithmetic although it may also be implemented using some exact representation. The types vector and matrix are typically implemented using arrays, but may also be implemented using a sparse representation.) Link types link(t), are used to represent foreign keys to a table t as the type int $\{t\}$. Let c range over constant data of base type, and write ty(c)=T to mean that constant c has type T. This is summarized below Types and Values: Scalars, Records, Arrays, Link Types
T,U::=bool|int|real|$\{f_1:T_1; \ldots; f_n:T_n\}$|T[ ]|link(t)
V::=c|$\{f_1=V_1; \ldots; f_n=V_n\}$|$[V_1; \ldots V_n]$ The above notation means that T and U (which are alternative metavariables for types) may be of a Boolean, an integer, a real number, a record $\{f_1:T_1; \ldots; f_n: T_n\}$, an array T[ ] or a link type link(t). And also that a value V is a constant c which ranges over data in a record, or an array.

Possible expressions in the language Fun which are also available in TABULAR include
E,F::=expression
x|c variable, constant
if E then $F_1$ else $F_2$ if-then-else
$\{f_1=E_1; \ldots; f_n=E_n\}$|E.f record literal, projection
$[E_1; \ldots; E_n]$|E[F] array literal, lookup
[for x<$E_1$→$E_2$] for-loop (scope of index x is $E_2$)
let x=E in F let (scope of x is F)
g($E_1, \ldots, E_n$) primitive g with arity n
D($E_1, \ldots, E_l$) distribution D with arity n In TABULAR expression syntax, assume a collection of total deterministic functions g, including arithmetic and logical operators. Also assume families D of primitive probability distributions, including the following. (A Gaussian takes a parameter prec; the standard deviation σ follows from the identity $\sigma^2$=1/prec.)
Distributions: D:($x_1:T_1, \ldots, x_n:T_n$)→T
Bernoulli:(bias:real)→bool
Gaussian:(mean:real, prec:real)→real
Beta:(a:real, b:real)→real
Gamma: (shape:real, scale:real)→real
Tuples ($E_1, \ldots, E_1$) and tuple types $T_1* \ldots *T_n$ may be used: they stand for the corresponding records and record types with numeric field names 1, 2, ..., n. The notation fst E is for E.1 and snd E for E.2.

Semi-Observed Models

The semantics of Tabular is explained by translating to Bayesian models encoded using Fun expressions. Consider a Bayesian model to be a probabilistic function, from some input to some output, that is governed by a parameter, itself chosen as a probabilistic function of a hyperparameter.

The output is semi-observed, that is, each output is a pair, consisting of an observable component plus an unobserved latent component.

For example, use variable x for the input, y for the observable output, z for the latent output, w for the parameter, and h for the hyperparameter.

These variables range over Fun values and hence may be scalars, but may also be compound structures built from records and arrays such as rows, tables, or whole databases, or indeed the empty record $\{\}$, which represents a unique, thus token value.

Notation for Model P:
Hyper $E_h$ default hyperparameter ($E_h$ deterministic)
Prior(h) $E_w$ distribution over parameter (given h)
Gen(w,x) $E_{yz}$ distribution over output (given w and x)

The annotations to the database schema together form a model of data in the database where the model is expressed using the above notation.

Consider a database table R as being a Fun value that is an array of rows, each of which is a record $\{c_1=V_1; \ldots; c_n=V_n\}$, where $c_1, \ldots, c_n$ are the columns of the table, and $V_1, \ldots, V_n$ are the items in the column for that row. (Consider a table as an array so that a primary key is simply an index into the array, and omit primary keys from rows.) A whole database is a record $\{t_1=R_1; \ldots; t_n=R_n\}$ holding tables $R_1, \ldots, R_n$ named $t_1, \ldots, t_n$.

Syntax of Tabular

A relational schema (or non-relational schema) confers structure on a database. A schema $\mathbb{S}$ is an ordered list of tables, named $t_1, \ldots, t_n$, each of which has a table descriptor $\mathbb{T}$, that is itself an ordered list of typed columns, named $c_1, \ldots, c_n$. Tabular places an annotation A on each column so as to define a probabilistic model for the relational schema. This is now summarized:

Tabular: Schemas, Tables, and Annotations:
$\mathbb{S} ::= \{t_1 \mapsto \mathbb{T}_1; \ldots; t_n \mapsto \mathbb{T}_n\}$ (database) schema
$\mathbb{T} ::= \{c_1 \mapsto A_1:T_1; \ldots; c_m \mapsto A_m:T_m\}$ table descriptor
A::=Input|Latent(M)|Observable(M) annotation An annotation A indicates that a column is part of the input, the latent output, or the observable output of the model for the whole schema. A model expression M provides a generative process for each output column, possibly in terms of parameters or hyperparameters, and preceding columns and tables.

Model Expressions for TABULAR:
M::=model expression
gen(E) simple
static(M) static
hyper(E) hyperparameter
M with f=E hyperparameter update
M[E<c] indexed
M withprior E parameter update
CBernoulli|CGaussian|CDiscrete library A CGaussian model outputs samples from a Gaussian distribution, whose mean and precision are sampled from a Gaussian and Gamma distribution respectively.

An example of a mixture model expressed using TABULAR is now given. A mixture model is a probabilistic choice between two or more other models. In this example the relational database schema comprises a User table, a movie table and a ratings table.

The schema for the User table is annotated as follows:
z int latent CDiscrete with N=4
Name string input
IsMale bool observable CBernoulli[z]
Age int observable (CDiscrete with N=100)[z]

The user table has a latent column added for storing latent variable z which is an integer. This column is annotated with the CDiscrete model expression from a library of model expressions. The CDiscrete model outputs samples from a discrete distribution over the natural numbers less than its hyperparameter N, with parameter vector given by a Dirichlet distribution. The name column of the table is of type string and is marked as an input column. The IsMale column of the table is of type Boolean and is marked as an observable output column and has an annotation which is the CBernoulli model expression from a library of model expressions. The Age column is of type integer and is marked as an observable output column. It is annotated with the CDiscrete expression from a library of model expressions. N is 100 indicating there are 100 possible age values.

The movie table is annotated as follows:
z int latent CDiscrete with N=4
Title string input
Genre int observable (CDiscrete with N=7)[z]
Year int observable (CDiscrete with N=100)[z]

The movie table has a latent column for latent variable z which is of type integer and this column is marked as a latent column. It is annotated with the model expression CDiscrete from a library of model expressions. The movie table has a title column with type string and which is marked as an input column. The movie table has a genre column with type integer and which is marked as an observable output column. It is annotated with the CDiscrete expression from a library of model expressions. N is 7 indicating there are 7 possible genres. The movie table has a year column of type integer and which is marked as an observable output column. It is annotated with the CDiscrete expression from the library. N is 100 indicating there are 100 possible years.

The rating table is annotated as follows
u link(User) input
m link(Movie) input
Score int observable (CDiscrete with N=5)[u.z,m.z]

The rating table has a column u storing foreign keys to the user table. It has a column m storing foreign keys to the movie table. It has a score column storing integers and this column is marked as observable output and annotated with the CDiscrete expression from the library.

The schema illustrates a couple of notations regarding indexed models. First, a doubly-indexed model M[E1<c1, E2<c2] is short for (M[E1<c1])[E2<c2]. Second, write M[E] as short for M[E<n] when there is knowledge that E is output by CDiscrete with N=n. (The annotation for Score in the rating table uses both these notations.)

Each row in the User table has IsMale and Age attributes, which are modeled using CBernoulli and CDiscrete, indexed by the latent variable z, which takes on four values. Consider four clusters of users, and for each cluster, there is a different distribution over gender and age. Similarly, each row in the Movie table is modeled by a four-way mixture with Genre and Year attributes. Finally, each row in the Rating table has links to a user and to a movie, and a Score attribute, modeled by a discrete distribution indexed by the clusters of the user and the movie.

Next, the semantics of Tabular schemas are explained in four steps, starting with model expressions M, which are components of annotations A.

Semantics of Model Expressions

The semantics of a model expression M for a column c is a model whose output y explains how to generate the entry for c in each row of a table. The models for gen(E), static(M), and hyper(E) are given below; these models have no input (that is, x={ }) and no latent output (that is, z={ }).

A model gen(E) produces its output by evaluating E.
Model for gen(E):
Hyper The empty record ff.
Prior(h) The empty record ff.
Gen(w,{ }) y where ~E.

A model static(M) sets its parameter to the output of M.
Model for static(M) where P is the model for M:
Hyper P.Hyper.
Prior(h) w where w'~P.Prior(h) and w~P.Gen(w'; { }).
Gen(w, { }) w.

A model hyper(E) sets its hyperparameter by evaluating E.
Model for hyper(E):
Hyper h where h:=E.
Prior(h) h.
Gen(w, { }) w.

Model for M with f=E where P is the model for M:
Hyper P.Hyper with field f replaced by value of E.
Prior(h) P.Prior(h).
Gen(w, { }) P.Gen(w,{ }).

Model for M[E<c] where P is the model for M:
Hyper P.Hyper.
Prior(h) [$w_0$; . . . ; $w_{c-1}$] where $w_i$~P.Prior(h) for each i<c.
Gen(w, { }) y~P.Gen($w_i$,{ }) and i=E.

Semantics of a Row of a Table

When writing TABULAR semantics it is convenient to group the columns of a table into inputs, latent outputs, and observable outputs. To do so, view a table $\mathbb{T}$ with n columns as the following concatenation, where the index sets I, L, O are a partition of 1 . . . n (that is, the sets are disjoint and their union is 1 . . . n).

($c_i$ ↦ Input:$T_i$)$^{i \in I}$
($c_l$ ↦ Latent($M_l$):$T_l$)l∈L
($c_o$ ↦ Observable($M_o$):$T_o$)o∈O The semantics of a row of a table is the following model, whose input is a record with the input fields of the row and whose output is a pair of records for the latent and observable fields.

Model for a Row of the Table $\mathbb{T}$, where $P_j$ models each $M_j$:
Hyper A record with fields $c_j$:=$M_j$.Hyper for j∈L∪O.
Prior(h) A record with fields $c_j$ $M_j$.Prior(h.$c_j$) for j∈L∪O.
Gen(w,x) A pair of records (y, z), setting y to have fields $c_o$~$M_o$.Gen(w.$c_o$, { }) for o∈O, and z to have fields $c_l$~$M_l$.Gen (w.$c_l$,{ }) for l∈L, having bound input variables $c_i$:=x.$c_i$ for i∈I.

As a notational convenience, use each column name $c_j$ in multiple ways: as a field of the hyperparameter record (if the column is an output, that is, j∈L∪O); as a field of the input record (if the column is an input, that is, j∈I); and as a field of the output records (if the column is an output, that is, j∈L∪O).

For example, here is a single-table schema for linear regression.
LinearRegression
muA real latent hyper(0)
muB real latent hyper(0)
A real latent static(gen(Gaussian(muA,1)))

B real latent static(gen(Gaussian(muB,1)))
X real input
Z real latent gen(A*X+B)
Y real observable gen(Gaussian(Z,1))

The row semantics of this table is as follows. Use a record notation where field names, such as muA and muB, remain in scope to help define subsequent fields, such as A and B. For readability, inline some variable definitions.

Model for a Row of the LinearRegression Table:
Hyper {muA=0; muB=0; A={ }; B={ }; Z={ }; Y={ }}
Prior(h) {muA=h.muA; muB=h.muB; A=Gaussian(muA,1); B=Gaussian(muB,1); Z={ }; Y={ }}
Gen(w,x) (y, z) where y={Y=Gaussian(z.Z,1)} and z={muA=w.muA; muB=w.muB; A=w.A; B=w.B; Z=A*(x.X)+B}

Semantics of a Whole Table

The semantics of a whole table is a model whose input x is the input sub-table, an array of records holding the input columns, whose observable output y and latent output z are the observable sub-table and the latent sub-table, respectively, that is, arrays of records holding the observable and latent columns of the table. The semantics of the whole table $\mathbb{T}$ is Map2(P) where P is the model for a row of $\mathbb{T}$, and Map2 is a model combinator specified below.

Model for Map2(P):
Hyper P.Hyper
Prior(h) P.Prior(h)
Gen(w,x) A pair (y, z) of arrays of records, where y=$[y_0; \ldots ; y_{n-1}]$ and z=$[z_0; \ldots ; z_{n-1}]$ and each $(y_i,z_i)$~P.Gen(w, $x_i$) for i<n, where x=$[x_0; \ldots ; x_{n-1}]$.

Foreign Keys are supported, for example, to translate schemas. The Fun type link(t) is used to represent foreign keys. Using the notation (E:link(t)).c within Fun expressions to stand for the column c of the row in table t indexed by key E. (In examples, omit the type link(t), assuming it can be inferred from context.) In particular, when constructing the model $P_j$ for table $t_j$, it is possible to dereference a foreign key of type link(t) to a previous table $t_i$ with i<j. For instance, in the example of FIG. 2, there is a reference from $t_2$=Matches to $t_1$=Players. To translate such foreign keys, arrange that the fixed global variables $y_1$, and $z_i$ hold the input, observable, and latent sub-tables for $t_i$. Hence, consider a Fun expression (E:link($t_i$)).$c_j$ to be an abbreviation for $x_i[E].c_j$, $y_i[E].c_j$, or $z_i[E].c_j$, depending on whether the column $c_j$ is input, observable, or latent, respectively. For instance, (Player1:link(Players)).s expands to $z_i$[Player1].s because s is a latent column.

Semantics of a Schema

The semantics of the whole schema $\mathbb{S}$ is the following model, whose input x is the input database, that is, a record holding the input sub-tables of the schema, whose observable output y is the observable database, that is, a record holding the observable sub-tables of the schema, and whose latent output z is the latent database, that is, a record holding the latent sub-tables of the schema.

Model for Schema $\mathbb{S} = \{t_1 \mapsto \mathbb{T}_1; \ldots ; t_n \mapsto \mathbb{T}_n\}$:
Let $P_i$ model a row of $\mathbb{T}_i$, and let $P'_i$=Map2($P_i$), for i∈1 . . . n.
Hyper A record with fields $t_i$:=$P'_i$.Hyper for i∈1 . . . n.
Prior(h) A record with fields $t_i$~$P'_i$.Prior(h.$t_i$) for i∈1 . . . n.
Gen(w; x) A pair of records (y, z), where y has fields $t_i=y_i$, and z has fields $t_i=z_i$, for i∈1 . . . n, setting $(y_i, z_i)$~$P'_i$.Gen(w.$t_i$, $x_i$) for i∈1 . . . n, having bound input variables $x_i$:=x.$t_i$ for i∈1 . . . n.

To illustrate schema translation and treatment of foreign keys, here is the translation of the example of FIG. 2, rewritten a little for readability: first, the two row models for the two tables, followed by the model of the whole schema. Since the models of p1 and p2 in Matches dereference foreign keys to Players and extract latent fields, the model $P_2$ has free occurrences of the variable $z_1$ which is expected to hold the latent sub-table of $t_1$.

Model $P_1$ for a Row of Table $t_1$=Players:
Hyper {s={ }}
Prior(h) {s={ }}
Gen(w,x) (y, z) where y={ } and z={s=Gaussian(25,0.01)}
Model $P_2$ for a Row of Table $t_2$=Matches:
Hyper {Perf1={ }; Perf2={ }; Win1={ }}
Prior(h) {Perf1={ }; Perf2={ }; Win1={ }}
Gen(w,x) (y, z) where y={Win1=(z.Perf1>z.Perf2)} and z={Perf1=Gaussian($z_1$[Player1].s,1); Perf2=Gaussian($z_1$[Player2].s,1)} and Player1:=x.Player1 and Player2:=x.Player2.

Model for the Schema of the FIG. 2 example:
Hyper {Players=$P_1$.Hyper,Matches=$P_2$.Hyper}
Prior(h) {Players=$P_1$.Prior(h),Matches=$P_2$.Prior(h)}
Gen(w,x) A pair of records (y, z), where y={Players=$y_1$; Matches=$y_2$}, and z={Players=$z_1$,Matches=$z_2$}, and ($y_1$, $z_1$)~Map2($P_1$).Gen(w.$t_1$,$x_1$), and ($y_2$, $z_2$)~Map2($P_2$).Gen(w.$t_2$,$x_2$), having bound $x_1$:=x.Players and $x_2$:=x.Matches.

A Reference Learner for Query-as-Latent-Columns

To perform queries, TABULAR may bundle a database and a schema into a learner L. The abstract state of a latent query learner is simply a database together with an annotated schema ($D_x$; $D_y$ | $\mathbb{S}$), where $D_x$ is a record holding the input tables and $D_y$ is a record holding the observable output tables.

TABULAR supports the following functional API on learners.

Let $L_0(\mathbb{S})$ be the empty learner for $\mathbb{S}$, that is, a pair of databases with the right schemas but no data in any of the arrays.

Let train(L,$D'_x$,$D'_y$) be L'=($D_x$+$D'_x$,$D_y$+$D'_y$) where + is the concatenation of records of arrays, and L=($D_x$,$D_y$).

Let params(L) be the posterior distribution p(w|L).

Let latents(L) be the posterior latent distribution p(z|L).

This new API can learn latent outputs since it works on semi-observed models. The API allows an incremental implementation, where the abstract state L is represented by a distribution over the parameters and latent variables, computed after each call to train. The implementation computes approximate marginal forms of latent variables and parameters, and stores them as database tables.

As mentioned above, a second form of inference predicts missing values from partially-observed data; for example, by inferring a posterior probability distribution of missing values in observable columns conditioned on observed values actually present in the database. An example of this second form of inference is now given.

Given a probabilistic model for a whole spreadsheet, the system of FIG. 1 may fill in the missing values of empty cells, and also detect outliers: cells whose values are far from what is predicted by the model. The probabilistic model may be an annotated database schema as described in this document, where each spreadsheet column is observable and may have missing values, and there is an additional latent column for each row, which is used in the model for each observable column. The Tabular schema below corresponds to such a Generalized Gaussian model for a three-column table. Considering real-valued columns; other data types such as Booleans and integers can also be encoded as (vectors of) real numbers combined with appropriate link functions.

Generalized Gaussian

| V | vector | latent | CVectorGaussian with Ncols = 3 |
|---|--------|--------|-------------------------------|
| X0 | real | observed | gen(V[0]) |
| X1 | real | observed | gen(V[1]) |
| X2 | real | observed | gen(V[2]) |

(The library model CVectorGaussian is akin to CGaussian, but
outputs vectors from a multi-dimensional Gaussian distribution.)

The query is a table containing the spreadsheet data, with empty
cells replaced by the symbol "?" For example:
GG

| ID | X0 | X1 | X2 |
|----|-----|-----|-----|
| 0 | 1.0 | 2.1 | 2.9 |
| 1 | 2.1 | ? | 6.3 |
| 2 | ? | 2.7 | 3.5 |

Many instances of the second form of inference can be translated into the first form of inference. This may be achieved by making a copy of the original table, but with each observable column turned into a latent column, and creating a new table (called a query table) for each observable column of the original table, which holds the values that are actually present. For example, the GG model above translates to the following tables.
GG'

| V | vector | latent | CVector Gaussian with Ncols = 3 |
|---|--------|--------|--------------------------------|
| X0 | real | latent | gen(V[0]) |
| X1 | real | latent | gen(V[1]) |
| X2 | real | latent | gen(V[2]) |

X0

| R | link(GG') | input | |
|---|-----------|-------|---|
| V | real | observable | gen(R.X0) |

X1

| R | link(GG') | input | |
|---|-----------|-------|---|
| V | real | observable | gen(R.X1) |

X2

| R | link(GG') | input | |
|---|-----------|-------|---|
| V | real | observable | gen(R.X2) |

Above, the query tables (X0, X1, and X2) each contain a value column v and a reference column r, which denotes the row the value came from. Since the GG' table contains no input columns, all the data is in the query tables as follows:

| Query Table X0 | | |
|----|---|-----|
| ID | R | V |
| 0 | 0 | 1.0 |
| 1 | 1 | 2.1 |

| Query Table X1 | | |
|----|---|-----|
| ID | R | V |
| 0 | 0 | 2.1 |
| 1 | 2 | 2.7 |

| Query table X2 | | |
|----|---|-----|
| ID | R | V |
| 0 | 0 | 2.9 |
| 1 | 1 | 6.3 |
| 2 | 2 | 3.5 |

Figure 10:
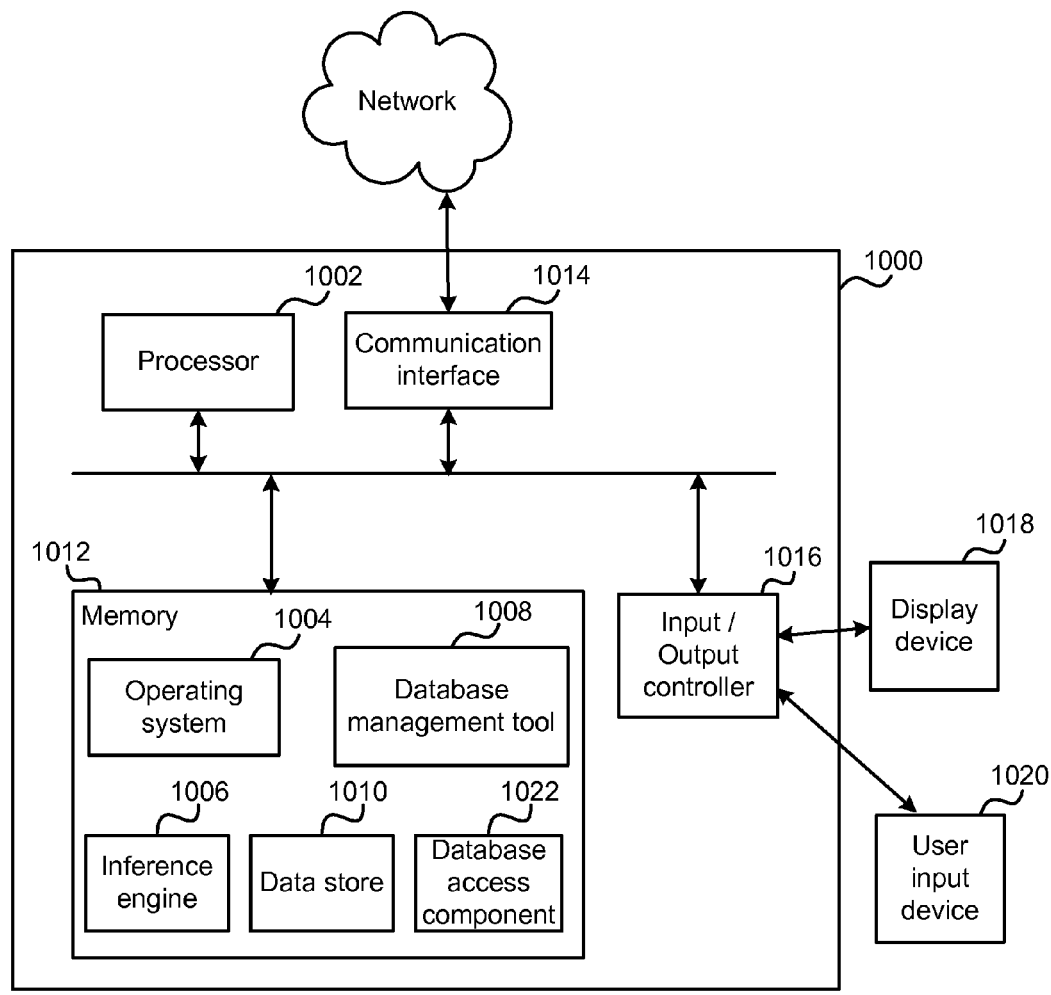
FIG. 10 illustrates an exemplary computing-based device in which embodiments of a database management system or database access component may be implemented.

FIG. 10 illustrates various components of an exemplary computing-based device 1000 which may be implemented as any form of a computing and/or electronic device, and in which embodiments of a database access component 108 for databases may be implemented.

Computing-based device 1000 comprises one or more processors 1002 which may be microprocessors, controllers or any other suitable type of processors for processing computer executable instructions to control the operation of the device in order to infer data of a database such as by completing missing values of a database including missing foreign keys; identifying outlier values in a database; identifying errors in a database and suggesting corrected values; highlighting differences and similarities between data in a database. In some examples, for example where a system on a chip architecture is used, the processors 1002 may include one or more fixed function blocks (also referred to as accelerators) which implement a part of the methods described herein in hardware (rather than software or firmware). Platform software comprising an operating system 1004 or any other suitable platform software may be provided at the computing-based device to enable an inference engine 1006, a database management tool 1008, and a database access component 1022 to be executed on the device. In some examples the inference engine 1006 is not present at the device and may be accessed via communication interface 1014. In some examples the database management tool 1008 is not present at the device and may be accessed via communication interface 1014.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to create, edit, delete, manipulate databases, issue queries to databases, omit columns or rows from inference, interact with graphical user interface 110, set sensitivity levels for outlier detection, and for other methods as described herein. In an embodiment the display device 1018 may also act as the user input device 1020 if it is a touch sensitive display device. The input/output controller 1016 may also output data to devices other than the display device, e.g. a locally connected printing device.

The input/output controller 1016, display device 1018 and optionally the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of database access comprising:
   receiving, at a processor, an identifier of a database;
   annotating a schema of the database with a plurality of expressions which describe probability distributions over entries in the database;
   using the annotated schema to access the database and to obtain, as a result of inference on the accessed data according to the annotated schema, one or more predictive probability distributions over entries of cells in the database; and
   the result of the inference being generated by an inference engine, generating the result of the inference comprising sending to the inference engine at least one of:
      database column types; or
      an indication of whether the database columns are input, latent, or observable.

2. A method as claimed in claim 1 comprising adding at least one column to a schema of the database, the column arranged to store data learnt by inference algorithms applied to data stored in the database.

3. A method as claimed in claim 1 wherein annotating the schema comprises annotating columns of the schema of the database as being any one of: input columns, output observable columns, latent output columns.

4. A method as claimed in claim 1 where annotating the schema comprises interpreting columns of the schema of the database as having entries of a type which is any one of: integer, real, double, float, Boolean, foreign key, string, date-time, percentage.

5. A method as claimed in claim 1 where the plurality of expressions are computer program instructions.

6. A method as claimed in claim 1 wherein each expression describes a process for generating entries of the associated column in terms of parameters or hyperparameters, where a hyperparameter describes knowledge about the parameters.

7. A method as claimed in claim 1 wherein each expression describes a process for generating entries of the associated column in terms of one or more other columns or tables of the schema.

8. A method as claimed in claim 1 comprising sending the annotated schema, or a compiled version of the annotated schema, and identifier of the database, to an inference engine and receiving the predictive probability distributions from the inference engine.

9. A method as claimed in claim 8 comprising compiling the annotated schema into inference algorithms; and executing the inference algorithms to access data from the database and carry out inference using the accessed data to produce the predictive probability distributions.

10. A method as claimed in claim 1 comprising using the predictive probability distributions of added columns to respond to queries made to the database.

11. A method as claimed in claim 1 comprising receiving a query in the form of one or more partially filled tables of the database and returning a response to the query comprising the tables having completed data values obtained from the predictive probability distributions.

12. A method as claimed in claim 3 comprising converting an output observable column into a latent observable column in the annotated schema.

13. A method as claimed in claim 1 comprising writing entries computed from the predictive probability distributions into the database.

14. A computer-implemented method comprising:
   receiving, at a processor, a plurality of annotations to a database schema each annotation comprising an expression of at least one probability distribution over entries in the database;
   accessing data from the database by executing instructions compiled from the annotated database schema;
   carrying out inference on the accessed data by executing the instructions according to the annotated schema to produce one or more predictive probability distributions over entries of cells of the database, the inference being executed by an inference engine having access to the database, the inference engine receiving at least one of:
      database column types; or
      an indication of whether the database columns are input, latent, or observable.

15. A database access component comprising:
   a communications interface arranged to receive an identifier of a database, the identifier comprising at least an address of the database;
   an inference engine arranged to receive at least one of:
      database column types; or
      an indication of whether the database columns are input, latent, or observable;
   a processor arranged to annotate a schema of the database with a plurality of expressions which describe probability distributions over entries in the database;
   a communications interface arranged to use the annotated schema to access the database and to obtain, as the result of inference on the accessed data according to the annotated schema, one or more predictive probability distributions over entries of the cells.

16. A database access component as claimed in claim 15 the communications interface arranged to send the annotated schema, or a compiled version of the annotated schema, and identifier of at least part of the database to the inference engine and receive the predictive probability distributions from the inference engine.

17. A database access component as claimed in claim 15 arranged to modify the database by adding columns and or tables according to the annotated schema and arranged to write entries to the added columns and or tables according to the one or more predictive probability distributions.

18. A database access component as claimed in claim 15 comprising a compiler arranged to compile the annotated schema.

19. A database access component as claimed in claim 15 arranged to use the predictive probability distributions to respond to queries made to the database.

20. A database access component as claimed in claim 15 being at least partially implemented using hardware logic selected from any one or more of: a field-programmable gate array, a program-specific integrated circuit, a program-specific standard product, a system-on-a-chip, a complex programmable logic device, a graphics processing unit (GPU), texturing hardware.

* * * * *